(12) United States Patent
García Manchado

(10) Patent No.: US 10,009,429 B2
(45) Date of Patent: Jun. 26, 2018

(54) METHOD AND SYSTEM FOR COMMUNICATION IN A PRE-DETERMINED LOCATION

(71) Applicants: SPOTLINKER, SL, Madrid (ES); Nilo García Manchado, Madrid (ES)

(72) Inventor: Nilo García Manchado, Madrid (ES)

(73) Assignee: SPOTLINKER, SL, Madrid (ES)

( * ) Notice: Subject to any disclaimer, the term of this patent is extended or adjusted under 35 U.S.C. 154(b) by 737 days.

(21) Appl. No.: 14/403,136

(22) PCT Filed: May 23, 2013

(86) PCT No.: PCT/ES2013/070333
§ 371 (c)(1),
(2) Date: Nov. 21, 2014

(87) PCT Pub. No.: WO2013/175044
PCT Pub. Date: Nov. 28, 2013

(65) Prior Publication Data
US 2015/0120881 A1  Apr. 30, 2015

(30) Foreign Application Priority Data

May 23, 2012 (ES) .................................. 201230780
May 30, 2012 (ES) .................................. 201230825
Jan. 18, 2013 (ES) .................................. 201330051

(51) Int. Cl.
*G06F 15/16* (2006.01)
*H04L 29/08* (2006.01)
(Continued)

(52) U.S. Cl.
CPC ......... *H04L 67/18* (2013.01); *G06Q 30/0261* (2013.01); *G06Q 50/10* (2013.01);
(Continued)

(58) Field of Classification Search
CPC .............................. H04L 67/18; H04L 67/141
(Continued)

(56) References Cited

U.S. PATENT DOCUMENTS 8,655,385 B2 * 2/2014 Li ........................... H04L 51/20
455/456.1
2008/0045236 A1  2/2008 Nahon et al.
(Continued)

FOREIGN PATENT DOCUMENTS

EP    1 217 549 A2   6/2002
EP      1217549 A2   6/2002
(Continued)

OTHER PUBLICATIONS

International Search Report, Spanish Patent Application No. PCT/ES2013/070333 dated Oct. 16, 2013.

*Primary Examiner* — Bharat N Barot
(74) *Attorney, Agent, or Firm* — Arent Fox LLP

(57) ABSTRACT

The invention relates to a method for communication within a pre-determined location, which establishes a relationship between a physical space or premises defined by its geographical position and a virtual space created in a server and which replicates the information contained in said physical space. The method is configured such that a user in possession of a mobile device with an interface application for accessing the server must first enter (101) the server through the application. Subsequently, the position of the user is detected (102) and a query is sent (103) to the server, such that: if there are multiple rooms, one is listed (104) and selected (105) by the user; and if there is only one room, the data associated with said room are consulted (106) directly in the server, the data are displayed (107) to the user, the user data are consulted (108) in the server and the user data are displayed (109) to the client.

9 Claims, 8 Drawing Sheets

(51) Int. Cl.
*H04W 4/021* (2018.01)
*G06Q 30/02* (2012.01)
*G06Q 50/10* (2012.01)
*H04W 4/21* (2018.01)
*H04W 4/04* (2009.01)

(52) U.S. Cl.
CPC ........... *H04L 67/141* (2013.01); *H04W 4/021* (2013.01); *H04W 4/21* (2018.02); *H04L 67/306* (2013.01); *H04W 4/043* (2013.01)

(58) Field of Classification Search
USPC ................. 709/202–205, 217–219, 245–246
See application file for complete search history.

(56) References Cited

U.S. PATENT DOCUMENTS

| | | |
|---|---|---|
| 2008/0140650 A1 | 6/2008 | Stackpole |
| 2010/0280904 A1* | 11/2010 | Ahuja .................... H04L 51/20 709/204 |
| 2011/0254683 A1 | 10/2011 | Soldan et al. |
| 2012/0047002 A1 | 2/2012 | Patel |
| 2013/0304824 A1* | 11/2013 | Garcia Manchado ..................... H04W 4/021 709/204 |
| 2014/0019552 A1* | 1/2014 | Oh .......................... H04L 67/18 709/204 |
| 2014/0025767 A1* | 1/2014 | De Kezel ............. G06Q 10/107 709/206 |
| 2014/0149498 A1* | 5/2014 | Nandlall .................. H04W 4/02 709/204 |

FOREIGN PATENT DOCUMENTS

| | | | |
|---|---|---|---|
| EP | 2 309 434 A1 | 4/2011 |
| EP | 2309434 A1 | 4/2011 |

\* cited by examiner

METHOD AND SYSTEM FOR COMMUNICATION IN A PRE-DETERMINED LOCATION

CROSS-REFERENCE TO RELATED APPLICATIONS

This application is a National Stage entry of International Application No. PCT/ES2013/070333, filed May 23, 2013, which claims priority to Spanish Patent Application Nos. P201230780, filed May 23, 2012, P201230825, filed May 30, 2012, and P201330051, filed Jan. 18, 2013. The disclosures of the prior applications are hereby incorporated in their entirety by reference.

OBJECT OF THE INVENTION

The object of the present invention is a method, system and computer product that allows establishing a virtual communication space between multiple users without prior relationship between them within a determined region or geographical area through a portable electronic device of all each of the users.

Another object of the invention is to interact with any public-use system or device connected with a server, so that a user can interact with the system through said server and from its own portable electronic device, without establishing a direct connection with the aforementioned public-use device.

STATE OF THE ART

In the current state of the art is not possible to create a social network, defined as a virtual communication space, associated with a particular point or area geographically defined, that is, at a determined location, so that users of said network do not have to have any prior or previous relationship with other users, limiting as far as possible that any person who is in a specific location can access the services provided by said social network, regardless of GPS or having its location accessible via mobile network, associating virtually as many people as possible, under the sole condition that they are at that time and in that place.

To limit the number of people who are in a particular place or position, virtual rooms are created, which are defined as virtual spaces for communicating through an external server, and which are based on the location of, at least, one user within a given area. In the present description, virtual room and virtual space will be treated as synonyms.

However, when the geographic position is defined by a GPS position, it has coverage problems, especially in the interior of buildings and in covered places. Therefore, a first problem to be solved by the present invention is that in a single room created with GPS coordinates and a radius of 25 meters, can occur that the system does not identify that the user is not within that range and, despite being in the place, not to identify the match allowing to enter the user in the virtual room associated with the place in which it is located.

A second technical problem, associated with and related to the first one, is that the GPS signal has a consumption proportional to its accuracy, that is, the more accurate the signal is, the more battery consumption is produced, which is a clear disadvantage for portable electronic devices. This means that the normal sensitivity of GPS devices is very low and, therefore, inaccurate.

Regardless of the aforementioned technical problems, currently there is a commercial need to develop a mobile application for each business, that is, a program containing a series of logical instructions that when they are executed by a processor in a mobile electronic device, this performs a series of actions that are customized for each particular business. This development arises from the need that every business has to have an own and different identity, but these must to be downloaded from mobile app stores (such as AppStore® or GooglePlay®) associated with different platforms and operating systems available today.

However, these app stores have security measures so that any developer can not enter malicious applications, i.e. applications with problems or security 'bugs' that, in some cases can even destabilize the portable devices. That is, the number of applications is restricted.

As a consequence, the app stores have become the same thing that the Internet is today, where there is a wide range of applications that the user can not have available within its phone.

Furthermore, it is known to one skilled in the art that the applications do not work like the web, where a user does not need to be installed one application for each web page that visits, but with a single browser the user visits a website with information other than shown in the previous website.

The latter is still possible with web browsers for mobile phones, but unlike computers, mobile phones (i.e., portable electronic devices) move with the user, providing a number of possibilities and troubleshooting that, until now, did not find viable solutions.

However, in the web pages accessible from mobile devices, it is difficult to know specifically who is the user visiting the website, and also has the problem to offer all the available information, no an information limited to the place in which it is located. In addition, the current solution is to have, each business or company, its own application, being also of little utility for the user and customer, in addition to being very expensive.

This problem is partially solved with the localized database systems or maps of points of interest, which are usually enriched with systems of type FourSquare®, which allow users to view information enriched through their databases. However, in these systems, the appearance and the ability to interact with the users from the own premises are not completely resolved, because they are based on providing its database formats.

Other known solutions are of the type "yellow pages", such as GooglePlaces® (see, for example, document WO2007/070358), wherein an existing web page is linked to a place or direction. By analyzing the situation or position of a premises, the user has access its website, the standard Web page. That is, when the system combines the user position with the hypothetical situation of the premises, a listing appears in which there may be a link to a website, however, this web page is not really located, since it is a mapping system which assigns in a database a position to a specific premises. This is precisely what solves GooglePlaces®, but does not solve the relation between the premises and people inside the premises, without combining the position data between people.

On the other hand, systems such as that implemented by Facebook®, will focus less on the physical reality that the user has in front, but it tries to provide the possibility of filtering their data by proximity to members of an existing social network. In all these cases there is also a problem, since although the application is entering the physical location of a specific company, the information provided is that in which the platform is interested, not that required by the company.

For example, if it is the case that a user is in a home appliances store, its platform can informs him/her about other near shops, or even that offer products in fair competition, which distorts the natural relationship between merchant and customer. This creates high doses of uncertainty in the purchase process, which can lead to not only a deterioration of the relationship, but it can affect the development of business, reason why it is desirable that each merchant has their own application, so that it allows providing information to the person who is directly in that place and not in another.

From another point of view, different public-use systems are known, such as the interactive information screens, which are based primarily on the possibility of touching the screen to interact with it. Systems based on the Bluetooth® standard (BT hereinafter in this same text) are also known which, when joined to the screen, create a direct telephone connection between the user's mobile device and the public-use system.

However, the direct connections are not recommended, since they imply a non-supervised connection with system and, therefore, generate an obvious risk through the introduction of viruses and other malicious software. This happens in any kind of direct connection, regardless of the technology employed, either BT or WIFI.

It is therefore desirable that, starting from the exact location of the user, it can interact with different public-use systems, normally located in establishments of public areas.

The document EP1217549 describes a hierarchical method that defines the world as primary (geographic location associated with a certain coordinates, such as for example, the city of Madrid) and secondary, which is defined as a sequence of nodes defined by an entity (for example, the Inditex Group) and, each one of the nodes are associated with at least one node in the primary world so that goods and services associated with said position can be offered. To that end, a complex distributed network of nodes is implemented that not allows the interaction between users, i.e., does not create a direct communication channel, or, in general, is a method for communication or social network, but it is a method for hierarchising the world and facilitating the search for information between nodes, based on, indeed, the user location.

In general, there is no method for direct communication or social network based exclusively on the position of users.

DESCRIPTION OF THE INVENTION

The present invention solves the technical problem related to securing the position of a user, that is, a user carrying a portable electronic device, in a particular space geographically defined, preventing the operating problems described of the GPS and ensuring the user position at all times to establish a virtual communication space between a plurality of users and/or provide users personalized information defined exclusively by said position.

To that end, the present invention provides a virtual space or virtual room, at least one, hosted on an external server, where the user has a portable electronic device with at least one location element selected from GPS, WIFI network discovery in the radio coverage of the device, Bluetooth® or any other way to find that said device is in a particular place, and where the boundary of the virtual room, that is, its coverage area, coincides as precisely as possible with the physical boundary of the place.

In a normal use of the invention, the user employs an application on their mobile phone that interfaces versus server and the virtual space created in the same, as if it were a normal web page, but with the particularity that the information sent and received passes through the virtual space created on said server, where it links with the position of said person, through the location means of the portable electronic device, so that the user accessing the virtual space is shown, as the first option, only the information relating to that particular place, creating the feeling of being connected to the premises virtually at the time that said user accesses the physical (position) premises.

In these types of applications there is a legal problem, since for a third party to share personal information of a user, this has to give its assent. Thus, when the user enters the premises and, therefore, their virtual room, the assent is automatically launched for acceptance by the user and share data, if necessary. If not, there is no assent launching. This is only possible because the user is logged on the server and it knows the specific location of the user.

Thanks to the application described is possible to provide only the information of the premises associated with the virtual space, avoiding the information of third parties who may be nearby. In addition, the creator of the virtual space has the ability or flexibility to display information it deems appropriate. Therefore, an important advantage provided by the invention is the use of a web custom designed by the creator of the virtual space or room, so that when the user accesses the interface application, the premises web page is displayed with the facilities that this provides, without searching or accessing via web browser to the web page.

The server enables a communication channel between it and users that are within the virtual space, that is, within the physical space. Thus, it is possible to send 'push' messages to all users or to a user previously selected, as they are visible from the application through the server, or with the owner of the premises or responsible for the virtual space created. These messages are not only in text form, but may also be in the form of voice and/or video, whether the mobile device allows. This is especially useful for sharing proposals, questions, concerns or even payments within the physical premises, establishing a social network within the particular premises where the common link is the room or virtual space created on the server and associated with that geographical position. This simplifies one of the objects of the present invention that is precisely the interaction with other public-use systems or devices.

As mentioned, it is very possible that in small spaces, the coverage radii of a particular room or virtual space overlap, or the mobile device itself does not have an adequate accuracy in GPS positioning. In this case, the application will offer the virtual spaces accessible at that point that, of course, will be always very limited compared to the typical internet search through lists or databases, thus solving the problem.

With HTML 5 it is possible to ask the user their position through the browser, but given that the hosting web is not defined geographically, it can never offer the information exclusive for the place where he/she is. With the method of the invention this problem is solved and the time for accessing a specific web is improved, since the user does not intervene (automatic access) and both times and consumption of network resources are optimized, since by establishing a direct channel between the server (hosting the premises information associated with the virtual space) and the user, it is clear that said times and consumption are significantly reduced against the normal access via browser.

This is how it is possible the experience that the user opens an application and in this, without any type of action by the user, appears, for example, the web page of the restaurant menu in which the user is at that moment, since this menu web page has associated a given physical coverage, or that the user, upon arrival to a different place and opens the same application, it becomes the web page of a supermarket with offers that coincides with the supermarket where that person is at that moment.

Linking the room with people who visit it, the system can provide relative information to those people without filtering by friendship or any other reason, because these people see each other physically, so if their profile information is generic and data are not specific, continue to maintain anonymity and some more details can be offered, such as their tastes, hobbies or claims he/she has in that particular place.

The rooms can have a rating that allows users to share more or less data with others or automatically activate a profile type. In reality there are places that are more favourable than others for meeting and when one is in one of them it is understood that he/she is more available to chat with others. A nightclub, a recreation area in a suburb, or a train station are places that can be defined as meeting places by the system. At that time, the system can provide the public, or low risk, user data to the other user automatically.

The system can differentiate places of residence, such as the home, where the user may have a less favourable attitude to share a profile, without offering data, than others such as for example the room of the workplace where the user wants to share the profile data to work with his/her partners.

The website can also has a password that may be needed for the times when the system is unable to locate the person, although is actually in the place, this particular place offers this information of the password that can allow those inside the room to see information of the same, for example, using codes, as described later in this specification.

The system can learn from places and find places with high connectivity by studying the transactions between users who are in a particular place and create a connectivity scale of the place as a function of several variables, thus building a map of connectivity between people.

In many cases it is necessary to relate the content provided the user with certain limitations, for example language, a certain content different due to its age, a different content or a campaign of marketing segmented by parameters of its profile, etc., the system can have a table or multiple relationships so that the website of the place provides information after knowing some data from the profile that segment it.

In addition, access to application is foreseen to activate and deactivate the presence or visibility within the virtual space, so that it can be done manually when the user considers it is appropriate, or automatically, through linking with the mobile device agenda, so that it is disabled, for example, in meetings or social events where it is not necessary. Similarly, this activation and deactivation can be done via the server, so that a virtual space is accessible only during a certain preset time period.

Another important feature of the invention is the relationship between the users with display or advertising screens. Every day one can see information and advertising in various places that offer information in a widespread manner, regardless of the type of people who are watching, through the knowledge by the system that one user or more are in the vicinity of a screen, each screen can have a room and these can be associated, this allows indicating as user approaches to the screen, for example in a hotel, where its room is, because this room would be based on WIFI or Bluetooth® and as the user exists offer him/her information about its destination. The imperative is that the room information can be seen on a screen and this can be dynamic and associated with the user, for example language, personal tastes, aesthetics, among others.

This embodiment allows an interaction with public-use systems, as indicated screens. To this end, the invention uses a server that has the information from where the public-use device is placed, for example, an interactive display, and the portable electronic device which, through its location, offers its position information to the server, and this sends what screen is closer, position which in many cases can be validated by knowing the presence or detection of a given MAC of any wireless network, the content on the screen being displayed on the user's portable electronic device located in front of said screen. That is, the position need not rely on GPS coverage.

Thus, the public-use device, for example, the interactive screen, in order to be able to position in itself without the intervention of an installer, can detect surrounding WIFI antennas and seek whether said WIFI has assigned any position defined by coordinates on any Internet servers such as Google® service.

Another possible formula is to insert a location number or word in the display, especially when the user wants to interact with it and in parallel or, if necessary, take as valid GPS data from this user to position the screen.

This solution allows the interaction of the user with the portable electronic device on the screen that is located in front of it without having a real connection with said screen, further solving the security problems arising from establishing a logical connection (wired or wireless) with a public-use device.

It is noteworthy that public-use devices logically incorporate the means required to interact with the portable electronic devices, both being treated in the same manner on the server. That is, from the viewpoint of the server, the portable electronics devices (i.e. a mobile phone) and the public-use devices are also users listed in the same, and associated with a particular position.

Finally, and in order to ensure the user position, the invention implements, in a particular embodiment, a code containing a particular reference to a geographical location defined by its coordinates, so that it implements the steps of detecting the code by an portable electronic device; reading the code by said portable electronic device and comparing the geographic data contained in said code with the geographical position contained in the portable electronic device, wherein if the geographical position contained in the code matches the geographical position of the portable electronic device, a secure communication channel with the external server is established.

Throughout the description and claims, the word "comprises" and its variations are not intended to exclude other technical features, additives, components or steps. For those skilled in the art, other objects, advantages and characteristics of the invention will emerge in part from the description and in part from the practice of the invention. The following examples and drawings are provided by way of illustration, and are not intended to be limiting of the present invention. Furthermore, the present invention covers all the possible combinations of particular and preferred embodiments herein indicated.

BRIEF DESCRIPTION OF THE FIGURES

Described very briefly hereinafter are a series of drawings that help to better understand the invention and which are expressly related to an embodiment of said invention that is presented as a non-limiting example thereof.

EXPLANATION OF A DETAILED EMBODIMENT OF THE INVENTION

Figure 1:
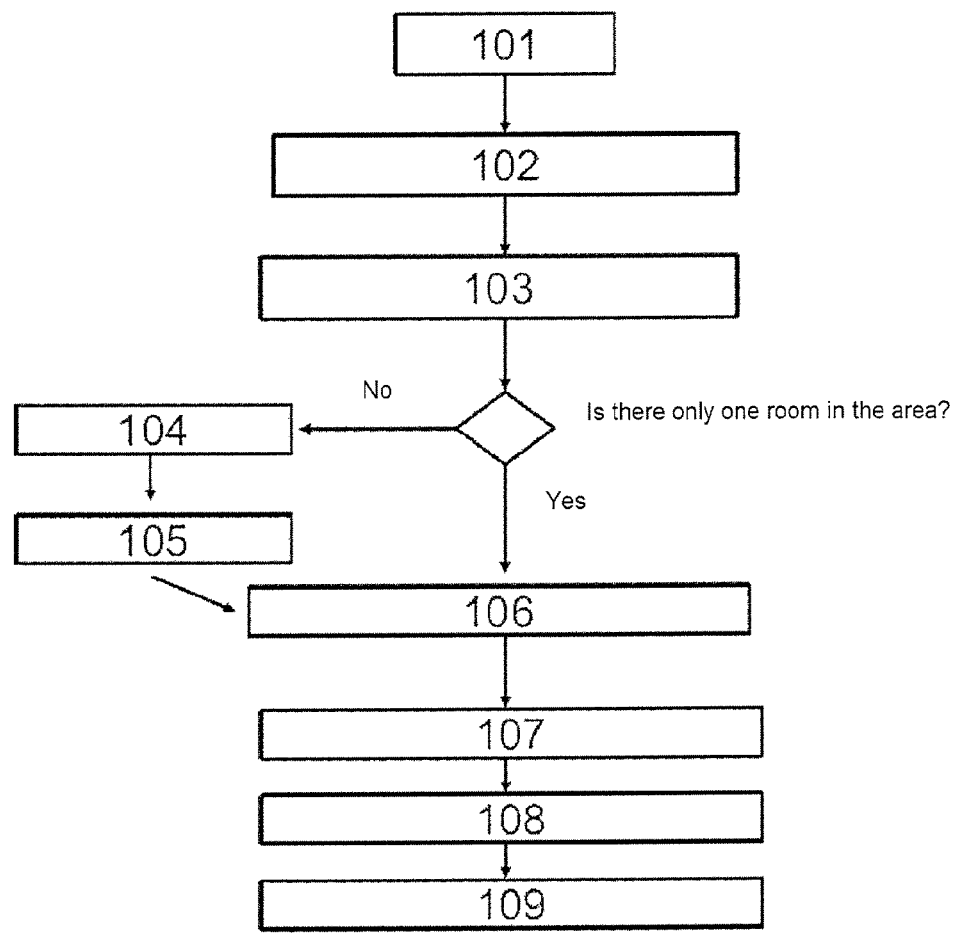
FIG. 1 shows the flow chart of the method object of the invention.

The present invention is implemented in a portable electronic device which may be any selected from computers, tablets, mobile phones, smart glasses and smart watches, although a preferred architecture for a portable electronic device is described below. In general, any programmable communication device can be configured as a device for this invention.

The portable electronic device of the invention includes a memory, a memory controller, one or more processing units (CPU's), a peripherals interface, RF circuitry, audio circuitry, a speaker, a microphone, an input/output (I/O) subsystem, a screen, generally a touch-screen, although not exclusively touch-sensitive, other input or control devices, and an external port. These components communicate over the one or more communication buses or signal lines. The device can be any portable electronic device, including but not limited to a handheld computer, a tablet computer, a mobile phone, a media player, a personal digital assistant (PDA), or the like, smart glasses or smart watch, including a combination of two or more of these items. It should be appreciated that the portable electronic device is only one example of a portable electronic device, and that the device may have more or fewer components than shown, or a different configuration of components.

The various components described below may be implemented in hardware, software or a combination of both hardware and software, including one or more signal processing and/or application specific integrated circuits. In the same way, the screen is defined as touch-sensitive, although the invention can also be deployed in devices with a standard screen.

The memory may include high speed random access memory and may also include non-volatile memory, such as one or more magnetic disk storage devices, flash memory devices, or other non-volatile solid state memory devices. In some embodiments, the memory may further include storage remotely located from the one or more processors, for instance network attached storage accessed via the RF circuitry or external port and a communications network such as the Internet, intranet(s), Local Area Networks (LANs), Wide Local Area Networks (WLANs), Storage Area Networks (SANs) and the like, or any suitable combination thereof. Access to the memory by other components of the device, such as the CPU and the peripherals interface, may be controlled by the memory controller The peripherals interface couples the input and output peripherals of the device to the CPU and the memory. The one or more processors run various software programs and/or sets of instructions stored in the memory to perform various functions for the device and to process data.

In some embodiments, the peripherals interface, the CPU, and the memory controller may be implemented on a single chip, such as one chip. In some other embodiments, they may be implemented on separate chips.

The RF (radio frequency) circuitry receives and sends electromagnetic waves. The RE circuitry converts electrical signals to/from electromagnetic waves and communicates with communications networks and other communications devices via the electromagnetic waves.

The RF circuitry may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RE circuitry may communicate with the networks, such as the Internet, also referred to as the World Wide Web (WWW), an Intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS), or any other suitable communication protocol, including communication protocols not yet developed as of the filing date of this document.

The audio circuitry, the speaker, and the microphone provide an audio interface between a user and the device. The audio circuitry receives audio data from the peripherals interface, converts the audio data to an electrical signal, and transmits the electrical signal to the speaker. The speaker converts the electrical signal to human-audible sound waves. The audio circuitry also receives electrical signals converted by the microphone from sound waves. The audio circuitry converts the electrical signal to audio data and transmits the audio data to the peripherals interface for processing. Audio data may be may be retrieved from and/or transmitted to the memory and/or the RF circuitry by the peripherals interface 108. In some embodiments, the audio circuitry also includes a headset jack. The headset jack provides an interface between the audio circuitry and removable audio input/output peripherals, such as output-only headphones or a headset with both output (headphone for one or both ears) and input (microphone).

The I/O (input/output) subsystem provides the interface between input/output peripherals on the device, such as the touch screen and other input/control devices, and the peripherals interface. The I/O subsystem includes a touch-screen controller and one or more input controllers for other input or control devices. The one or more input controllers receive/send electrical signals from/to other input or control devices. The other input/control devices may include physical buttons (e.g., push buttons, rocker buttons, etc.), dials, slider switches, and/or geographic location means such as GPS or the like.

The touch screen in this practical embodiment provides both an output interface and an input interface between the device and a user. The touch-screen controller receives/sends electrical signals from/to the touch screen. The touch screen displays visual output to the user. The visual output may include text, graphics, video, and any combination thereof. Some or all of the visual output may correspond to user-interface objects, further details of which are described below.

The touch screen also accepts input from the user based on haptic and/or tactile contact. The touch screen forms a touch-sensitive surface that accepts user input. The touch screen and the touch screen controller (along with any associated modules and/or sets of instructions in the memory) detects contact (and any movement or break of the contact) on the touch screen and converts the detected contact into interaction with user-interface objects, such as one or more soft keys, that are displayed on the touch screen.

In an exemplary embodiment, a point of contact between the touch screen 126 and the user corresponds to one or more digits of the user. The touch screen may use LCD (liquid crystal display) technology, or LPD (light emitting polymer display) technology, although other display technologies may be used in other embodiments. The touch screen and touch screen controller may detect contact and any movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

The device also includes a power system for powering the various components. The power system may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

In some embodiments, the software components include an operating system, a communication module (or set of instructions), a graphics module (or set of instructions), a user interface state module (or set of instructions), and one or more applications (or set of instructions).

The operating system (e.g., Darwin, RTXC, LINUX, UNIX, OS X, WINDOWS, or an embedded operating system) includes various software components and/or drivers for controlling and managing general system tasks (e.g., memory management, storage device control, power management, etc.) and facilitates communication between various hardware and software components.

The communication module facilitates communication with other devices over one or more external ports and also includes various software components for handling data received by the RF circuitry and/or the external port. The external port (e.g., Universal Serial Bus (USB), FIREWIRE, etc.) is adapted for coupling directly to other devices or indirectly over a network (e.g., the Internet, wireless LAN, etc).

The contact/motion module may detect contact with the touch screen in conjunction with the touch screen controller. The contact/motion module includes various software components for performing various operations related to detection of contact with the touch screen, such as determining if contact has occurred, determining if there is movement of the contact and tracking the movement across the touch screen, and determining if the contact has been interrupted (that is, if the contact has ceased). Determining movement of the point of contact, which is represented by a series of contact data, may include determining speed (magnitude), velocity (magnitude and direction), and/or an acceleration (including a change in magnitude and/or direction) of the point of contact. In some embodiments, the contact/motion module and the touch screen controller also detect contact on a touchpad.

The graphics module includes various known software components for rendering and displaying graphics on the touch screen. Note that the term "graphics" includes any object that can be displayed to a user, including without limitation text, web pages, icons (such as user-interface objects including soft keys), digital images, videos, animations and the like.

In some embodiments, the graphics module includes an optical intensity module. The optical intensity module controls the optical intensity of graphical objects, such as user-interface objects, displayed on the touch screen. Controlling the optical intensity may include increasing or decreasing the optical intensity of a graphical object. In some embodiments, the increase or decrease may follow predefined functions.

The user interface state module controls the user interface state of the device. The user interface state module may include a lock module and an unlock module. The lock module detects satisfaction of any of one or more conditions to transition the device to a user-interface lock state and to transition the device to the lock state. The unlock module detects satisfaction of any of one or more conditions to transition the device to a user-interface unlock state and to transition the device to the unlock state.

The one or more applications can include any applications installed on the device 100, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player (which plays back recorded music stored in one or more files, such as MP3 or AAC files), etc.

In some embodiments, the device may include one or more optional optical sensors (not shown), such as CMOS or CCD image sensors, for use in imaging applications.

However, the indicated hardware structure is one of the possible and it must be taken into account that the device can include other elements for capturing images, such as a camera, scanner, laser plotter or the combination of any of these types of devices, which can provide the mobile device the display of the actual environment in video format, sequence of images, vector format or any combination of the above formats.

Similarly, the device may include geographic location devices based on networks of GPS positioning satellites, devices of geographical location aid, based on GPS satellite networks, and IP location of Internet networks—AGPS—, geographical location devices based on the triangulation of radio signals provided by WIFI antennas and Bluetooth® devices (ISSP), the combination of any of these mentioned devices or any type of device which allows providing the mobile device numerical data of its geographical location.

The device may include any type of element capable of displaying images in real time with a minimum of 24 FPS (Frames Per Second) such as TFT, TFT-LED, TFT-OLED, TFT-Retina displays, the combination of any of the above as well as new generation Holo-TFT and transparent displays, and Micro-Projectors, or any graphic display device that can provide the mobile device a way of displaying visual content for the user.

The device includes a processor or set of processors that by themselves or in combination with graphics processors such as GPU (Graphics Processing Unit) or APU (Accelerated Processing Unit) can provide the mobile device the ability to display, in real time, vector graphics and conform polygons textured with these, through libraries for vector representation (sets of standardized procedures of graphic representation for different platforms) such as OpenGL, DirectX or any type of libraries intended for this purpose.

Below there is a brief, general description of a suitable computing environment (a server and a personal computer) in which embodiments of the invention may be implemented. While the invention will be described in the general context of program modules that execute on server and personal computer systems, those skilled in the art will recognize that the invention may also be implemented in combination with other types of computer systems and program modules.

Generally, program modules include routines, programs, components, data structures, and other types of structures that perform particular tasks or implement particular abstract data types. The invention may also be practiced in distributed computing environments where tasks are performed by remote processing devices that are linked through a communications network. In a distributed computing environment, program modules may be located in both local and remote memory storage devices.

The computer architecture that can be used as a server includes a central processing unit (CPU), a system memory, including a random access memory (RAM) and a read-only memory (ROM), and a system bus that couples the memory to the CPU. A basic input/output system containing the basic routines that help to transfer information between elements within the computer, such as during startup, is stored in the ROM. The computer further includes a mass storage device for storing an operating system, application programs, and other program modules, which will be described in greater detail below.

The mass storage device is connected to the CPU through a mass storage controller (not shown) connected to the bus. The mass storage device and its associated computer-readable media provide non-volatile storage for the computer. Although the description of computer-readable media contained herein refers to a mass storage device, such as a hard disk or CD-ROM drive, it should be appreciated by those skilled in the art that computer-readable media can be any available media that can be accessed by the computer.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computer.

According to various embodiments of the invention, the computer may operate in a networked environment using logical connections to remote computers through a network, such as the Internet. The computer may connect to the network through a network interface unit connected to the bus. It should be appreciated that the network interface unit may also be utilized to connect to other types of networks and remote computer systems. The computer may also include an input/output controller for receiving and processing input from a number of other devices, including a keyboard. Similarly, an input/output controller may provide output to a display screen, a printer, or other type of output device.

As mentioned briefly above, a number of program modules and data files may be stored in the mass storage device and RAM of the computer, including an operating system suitable for controlling the operation of a networked personal computer, such as for example the WINDOWS® operating system from MICROSOFT CORPORATION®. The mass storage device and RAM may also store one or more program modules. In particular, the mass storage device and the RAM may store a Web browser application program. As known to those skilled in the art, the Web browser application program is operative to request, receive, render, and provide interactivity with electronic documents, such as a Web page that has been formatted using HTML. Moreover, the Web browser application program may be operative to execute scripts contained in the Web page, such as scripts expressed utilizing the JAVA SCRIPT language from SUN MICROSYSTEMS, INC. According to one embodiment of the invention, the Web browser application program comprises the INTERNET EXPLORER Web browser application program from MICROSOFT CORPORATION. It should be appreciated, however, that other Web browser application programs from other manufacturers may be utilized to embody the various aspects of the present invention, such as for example the FIREFOX Web browser application from the MOZILLA FOUNDATION.

In particular, the Web page may include HTML and scripts which, when displayed by the Web browser application, provide a visual display for a spreadsheet. Moreover, the scripts included in the Web page allow a user of the computer to interact with the display provided by the Web browser application and modify the spreadsheet.

A network architecture that illustrates an operating environment for the various embodiments of the invention is described below. To that end, the computer is connected to a network. The server comprises a computer which may contain some or all the conventional computing components described above. Additionally, the server is operative to execute an application for receiving and responding to requests for documents stored at or accessible to the server. Moreover, the server is operative to receive and respond to requests received from the portable electronic devices. It should be appreciated that the Web application may comprise code executable at the server for communicating with other computers and/or the portable electronic devices, and may include templates, graphics, audio files, and other content known to those skilled in the art.

According to one aspect of the invention, the server application is operative to provide an interface to a user to interact with the room or virtual space for communication accessible via the portable electronic device. In particular, the application utilizes a server application programming interface (API). In the present description, the terms "room", "virtual room", "virtual space" and "virtual communication space" refer to the same concept.

A particular embodiment of the invention is shown in the accompanying figures. As shown in FIG. 1, the user in possession of a portable electronic device with an interface application for accessing the server must first enter (101) the server through the application. Subsequently, the position of the user is detected (102) and a query is sent (103) to the server, such that if there area multiple rooms, one is listed (104) and selected (105) by the user, and if there is only one room, the data associated with said room are consulted (106) directly in the server, the data are displayed (107) to the user, the user data are consulted (108) in the server and the user data will be displayed in the virtual communication space (109).

Figure 2:
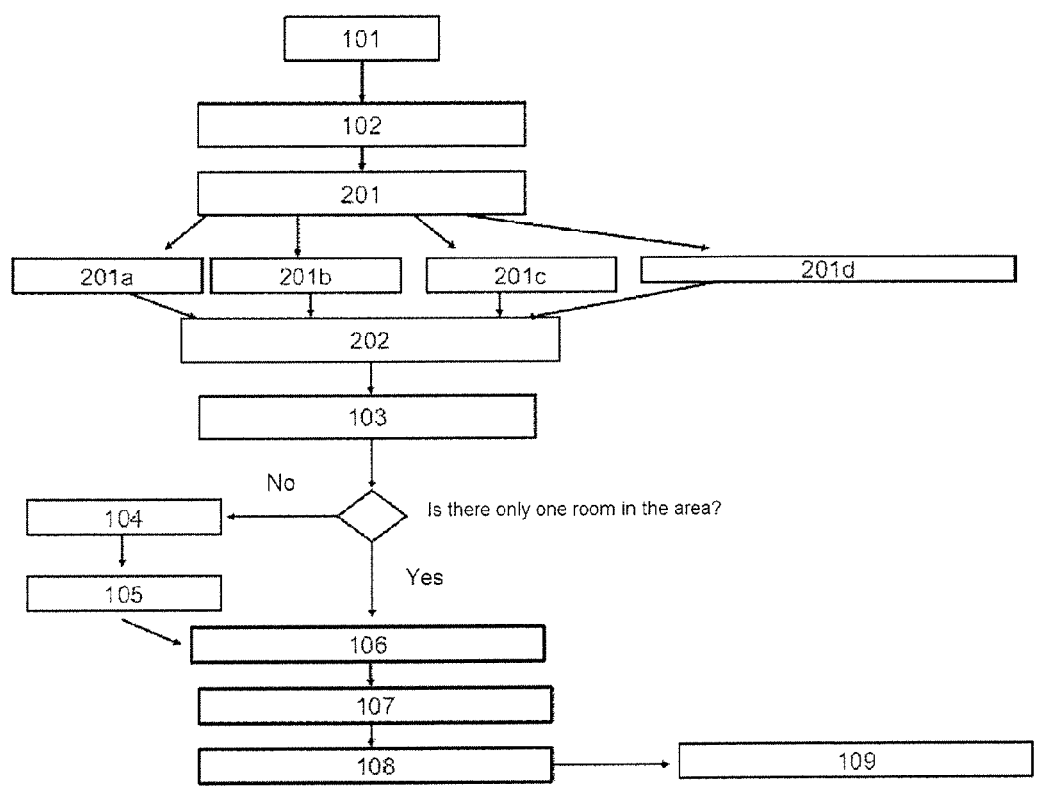
FIG. 2 shows the flow chart of the method of the invention showing different types of detection of the rooms or virtual spaces created.

As shown in FIG. 2, the detection of the user position 102 is carried out in a particular embodiment, first, the position accuracy is diagnosed (201), i.e., the quality of the position is analyzed, depending on the method used for this purpose, for example detection by triangulating WIFI signals (201a), or quality of GPS signal (analyzing whether it is weak (201b) or accurate (201c)), or by any other criteria (201d) that allows establishing the user position on the server, since in the invention the important thing is not only the position, but its correlation with a particular physical space, i.e., the assumption by the server that the user is in a determined area (therefore the position can be relative) matters more than the precision (i.e. the absolute position).

The definition of the criteria for room query (202) includes, for example, the search radius to find the rooms closest to the user's GPS position, either by defining a search criterion with regard to the position of a WIFI network or Bluetooth® network (that will be its position, in turn, defined on the server) whether it is mobile or not.

For example, if the room is associated with a given mobile WIFI network, a radius of coverage can be defined for that WIFI which, logically, will move as the network moves. Similarly, the criteria may be combined, such as GPS position and a certain WIFI MAC. Subsequently, a query is sent (103) to the server, such that if there area multiple rooms, one is listed (104) and selected (105) by the user, and if there is only one room, the data associated with said room are consulted (106) directly in the server, the data are displayed (107) to the user, the user data are consulted (108) in the server and the user data are displayed (109) to the client.

Figure 3:
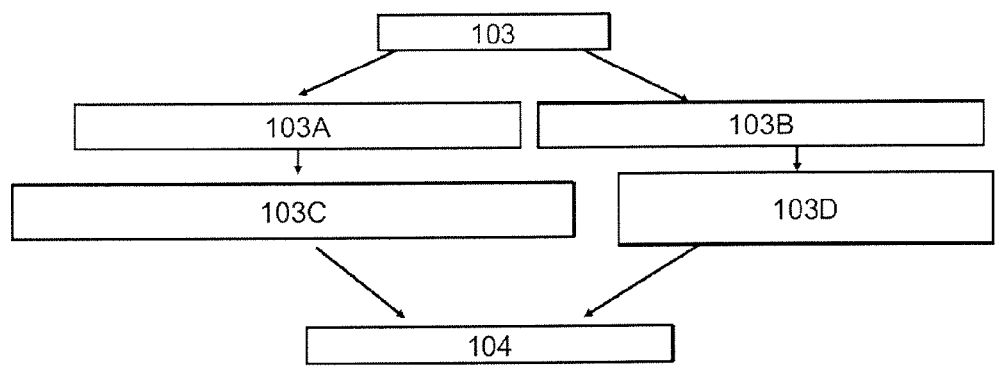
FIG. 3 shows the flow chart of the room query.

FIG. 3 shows how the detection of rooms 103 is carried out with two particular embodiments: the identification through the MAC of the visible WIFIs 103A by the mobile device and the detection of the user's GPS position 103B, by consulting on the server the room or rooms associated with the MAC of the detected WIFIs (the room may be defined by the visibility of two or more WIFI networks 103C) or with respect to the GPS position and a given radius 103D.

Figure 4:
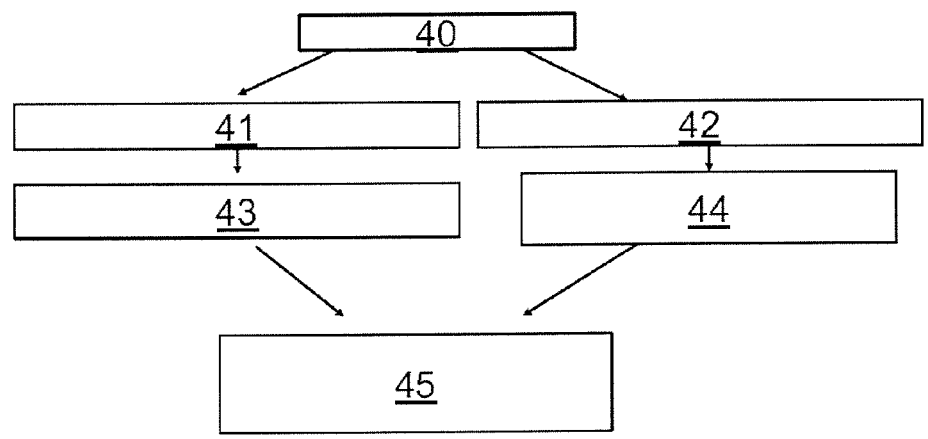
FIG. 4 shows the flow chart of room creation.

The creation of rooms on the server is shown in FIG. 4, wherein the room data entry 40 is made equally by two particular embodiments well defined, such as the identification of the MAC 41 of each of the WIFIs that the creator of the room understands that are the valid criteria as well as by detecting the user's GPS position 42. WIFI networks can be organized by signal strength, so such it is only possible to access the room from the detection of the WIFI MAC with certain strength 43. Similarly, in the embodiment by GPS detection, the radius of detection of the room is defined according to the quality of the GPS position 44. In both cases, the room is stored on the server, associating it with the GPS position and/or the MACS of the most powerful WIFIs 45.

Figure 5:
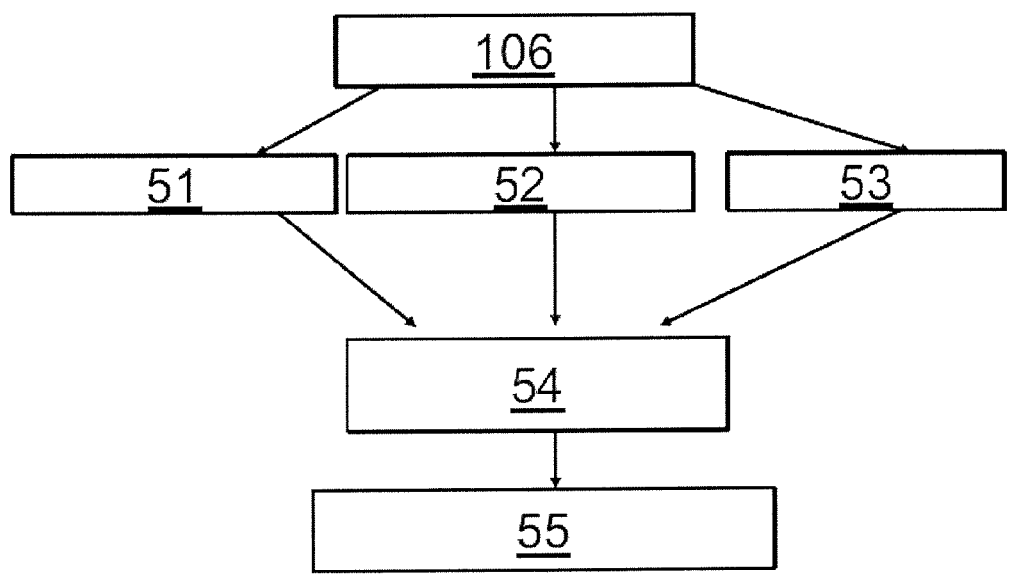
FIG. 5 shows the flow chart of sending messages in a virtual room.

FIG. 5 illustrates the process for sending messages between users, encompassed in the step of consulting of the room data on the server (106), three criteria combinable and complementary to each other being defined: (i) list of users inside the room 51; (ii) list of recent users of the room 52; and (iii) favourite users or with prior relationship 53. Subsequently, the user will select 54 the recipient of the message and this will be sent 55. The sending of the message can contain the details of the room from which the message was sent or the room in which the users are in advance.

Figure 6:
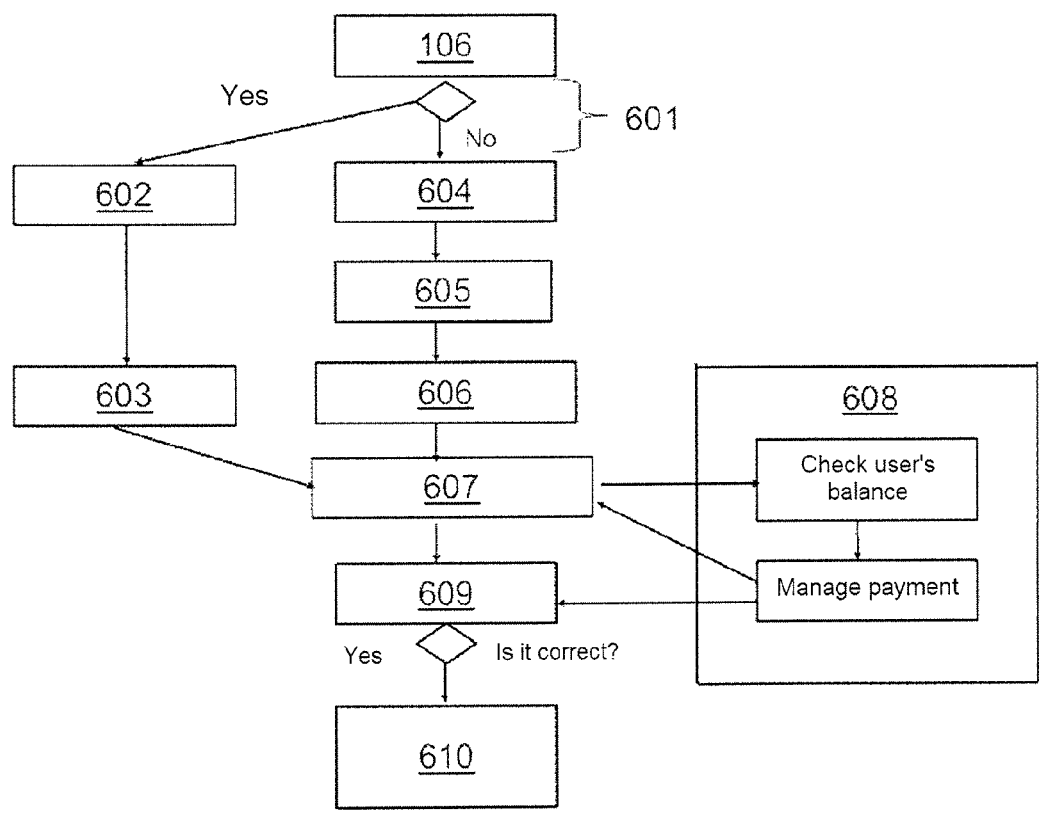
FIG. 6 shows the flow chart for payment in a room or virtual space.

On the other hand, the application, by its nature, allows the payment of certain services. Thus, as shown in FIG. 6, once the user is inside the room (room query 106) and that room allows payment for certain services, it is examined whether there is a transfer (601), the amount to be transferred is indicated (602) and the recipient is selected (603). If there is no transfers, then the affordable products are listed (604), the quantity of product and the product are selected (605) and the cost and destination is calculated (606).

After these processes, the payment is managed by the customer (607), through a Paypal® server or POS (608), the payment is checked on the server (609) and if it is correct, the parties are notified from the server (610).

Thanks to this solution of incorporating the payment means, the security greatly increases in online payment, since all is managed through the same server, with the added security of the physical knowledge between seller and buyer.

About the dynamic information of the rooms, this information may also coincide with events and change as it changes for example when the user is reaching an event, the system knows that in this room there is an event at that time and a room associated with said event detects the user, and the screen of the parking says: "welcome Mr X you are visiting the event Z" and offers you a guide among the different related rooms to take you to the destination.

It is also possible to notify the members of a group the entry into a room of a new person, when detecting the entry into the room the system provides information through the screens of the arrival of the user X.

About the segmentation of the social network, in many cases it is negative for the interests of the owners of the establishment or the event that free connections are established between all people of an event, for example an event organizer invites customers and suppliers and does not want that there are contacts between them without his/her intervention; to resolve this, the social network of the place can be segmented by the parameters that may be relevant, for example providing free entry to all employees of the establishment, but limited to customers, etc. Segmentation criteria can be associated with the user's profile, and rooms can build their own rules of social conduct, for example only the regular customers see the others, or the user only see members of staff or anyone who represents a new or established rule of social use according to the possibilities offered by this invention, by language, by religion, etc. All this may be internally related to access codes or with the fact that an administrator allows a user to access the room or that a veteran user recommends a new member of the room, for example.

The rooms can be associated with each other to reproduce human behaviours. For example, the entrance to a hotel can lead to the detection of host and offer it the route on screens towards the room, becoming the screen in a personal signalling system by associating the rooms on a route. There may be an association among the rooms that people use in general, for example after dining at a particular restaurant, the customers usually go to another place for drinks or typically and historically, to two different places depending on the day of the week, the system can analyze the history of people coming into the room and establish associations that are subsequently offered to the users thereof, for example creating a route of places to visit on one night.

Figure 7:
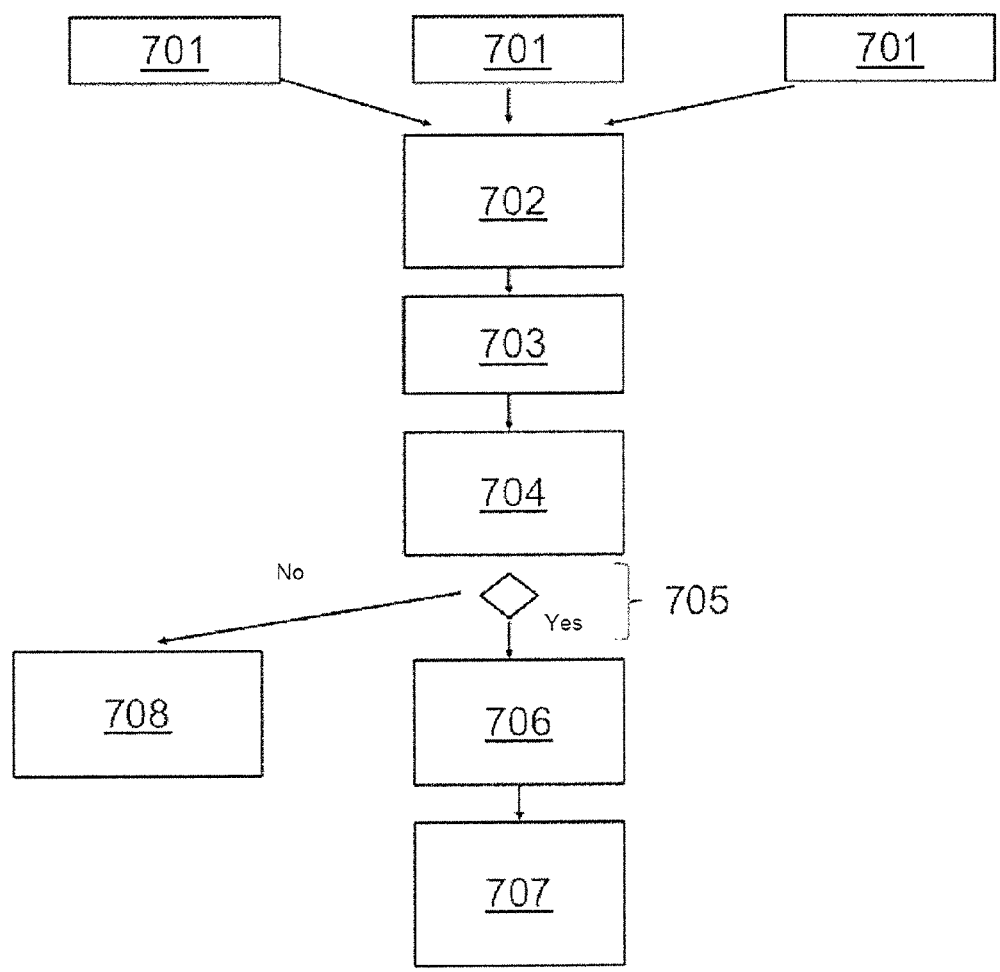
FIG. 7 shows the flow chart for the download of an application in a room or virtual space.

As can also be seen in FIG. 7, the method object of the invention allows the creation of specific applications for each place or combination of the same, so that in said application the user data are shared with the rest of applications creating a social network specific to the place but that interacts with the rest of social networks that belong to a macro social network. The reason is that the establishment may want to keep its identity also in the own publication of its application. This application if it was only published by the owner of the premises or promoter of the social network would not have the critical mass of users needed to monetize it and probably would be removed from the user applications by its lack of content. However, with the proposed method, the users can share information on their profiles and also the user could enter other positional web environments without downloading another application since the social layer would be the same with the restrictions deemed appropriate by the developer of the application, for example restrictions on advertising of non-competitors, not display of certain content or other rooms, etc.

More specifically, it is established a further process comprising one step of downloading applications comprising the steps of downloading an application (701); a second step of entering the application by the user (702); a third step of connecting (703) with the server, wherein the user may login or not on said server; a step of identifying the origin of the application (704) wherein if it has communication limitations (705), said limitations (706) are applied and the rooms or virtual spaces and users are presented in a limited manner (707); while if there are no limitations (708), the rooms and users are completely visualized (709).

This allows the real and effective creation of a private social network with the advantages of the aggregation of other networks created by other network promoters, since it keeps the personality of the promoter and gives it some ability to domain and control over the same. This system can be used in the relationship between users regardless of whether the users are present or not in the room and it is possible to send "push" messages to users regardless of their physical position. Users will then have an application installed promoted by the entity X, a store, an advertising campaign, a company, and when it is run and enters the general network and receives the options defined the general content, the contents and users are shared, although a different application can be created for every promoter.

Finally, it is possible to establish, as indicated messages, certain rewards or discount coupons for commercial activities.

In the whole process, the privacy of the user is guaranteed, so that every user can select whether it wants to be visible or not in the virtual space.

In a particular embodiment of the invention, the method and system object of the invention comprises an external server with a database including at least one screen position and a mobile device with means to define its position and send that position to the server, so that the correspondence of the mobile device with at least one screen is established on said server, and is characterized in that in said mobile device, the contents of the screen on which the closeness of the position is defined, are played.

Between the server and said mobile device is established a method of interacting with a screen, via mobile phone, comprising a first step of defining the position of at least one screen on a server; a second step of defining the position of at least one mobile device on said server; and a third step of establishing within a certain radius the correspondence between at least one screen and at least one mobile device. All of this further characterized in that, once established the correspondence between at least one screen and at least one mobile device, the method comprises a step of replicating the contents of the screen on said mobile device.

The location of the screen may occur on its own account without the intervention of an installer, since it can detect its surrounding WIFI antennas and search whether these WIFI have assigned any GPS address of certain server on the Internet, such as the Google service. Another formula is to insert a location number or word on the screen, especially when the user wants to interact with it, in such a way that any user can type it to interact with it and then give as valid the GPS data for that user to position the screen.

As the information may be shared in web environment, the user can have an information menu on the screen and execute which it considers appropriate. The practical embodiments of the invention are multiple. Thus, in a first application of this invention the user can display a music video on one or multiple screens as well as change the TV channels with a simple payment via mobile phone, for example at an airport.

Another possible application is to use the mobile device like the old jukeboxes in which the customer could choose the song he/she wanted to listen. This system can be used for ambient music, so that the ambient music system is connected to the Internet and has defined the position manually by the premises owner or automatically by the device itself with the help of an internal location system on the device. Thus, the mobile device sends the music that is playing on the store to the server or vice versa, the server emits the music to the client receiver and simultaneously informs what song is playing on the user's device which is located on the store, so that the user can interact with said music, for example buying a copy for later use on its own mobile phone.

This connection can be online or under a predefined schedule so that the user sees the menu of songs played both in that moment and previously and also the music scheduled for later. It is possible to buy or request a broadcast at the establishment of a determined music or do it in several places at the same time from the location itself or from a map for this purpose, in the same way it is possible to emit advertising in the establishment.

This remote control system may have added some password system on the mobile phone so that if the system detects various devices and one of them is for exclusive use may offer different options depending on the person or only may interact with the device if the user knows the password.

It is a kind of remote control that works through a server and what it does is to check that both the device or screen and the user are in the same place to offer various options. It may also interact with other devices such as a washing machine, vending machines, or any other public-use system.

In reference to the issue of sound, it is possible to define different zones within the premises in such a way that a premises map can be seen by the user in the premises and activate the zone in which he/she is, in addition, the user can be located in that area by any location technology.

An important stage is the verification that the device to be controlled is or not at that time in that place, to that end, one of the most appropriate methods is that the device to be controlled has in itself some method for location that defines which is at that moment in that place. As the connection to the device is through a computer and a network, a real communication is not established with the device, it is possible that the device is not in the same place it was, so the user could be commanding a device that is not in the same place. To resolve this, the system analyzes both devices, the user's phone or computer and the device to be commanded are in the same place. Another possible verification system consists of the activation of any mechanism to know the change. For example, we have given the order to an air conditioner to raise the temperature, the user's phone could check through a thermometer inside the device that the temperature has risen. Or, for example, the user has decided to change the song on a jukebox, the phone can activate the microphone at the time which the change order is provided to check, through the signal received by the microphone, that new song sounds at the moment in which user has changed it, since graphic that receives the microphone coincides at a certain percentage.

Other possible use of this system is to use the user's microphone or camera as a communication system with the device of the premises. Thus, in a conference where there are many attendees, one of them can activate the microphone and ask the rapporteurs. The system would activate an open communication channel between the user of the system and the amplifier in such a way that the signal is coming from the device that is virtually connected to the place. It is also possible to open a video line between the two devices in a way that the signal of the audio and video can be received simultaneously within the system so that both mechanisms are virtually connected. The difference between this and a phone is that the coincident location of both devices allows their interaction and that in neither case a telephone number or any other method of identification is necessary, since the position is the filter of a possible interaction. While in the case of phones or emails, or IPs, filter is in knowing the number or e-mail address or IP belonging to that which we are going to communicate with.

The status authentication system of the device is important so that there are no situations where the user thinks that is interacting with the device around and, however, this has changed of place and interacts with another that is not in the same place. To ensure that, without using the location, for example, in a public vending machine, the system can deliver a message that can be seen in part on a screen of the other device or a system which, before a purchase on the screen of the device to be interacted, sends any information relative to the user, for example, the name of the user who is going to buy a song on a video screen and simultaneously, the system can alert the user by the portable electronic device that certain information should appear in the element with which it intends to interact in order to check that they are interacting.

Sometimes the virtual room is detected irregularly. That is, at certain times it is detected by the user's device user and no in others. The reason for this irregularity is based on the inaccuracy of the position, which can vary even if the user does not change position substantially. In these applications, a wall or any other element may hinder accuracy in the position and the temporary validity of this. Another reason for needing time tickets is the instability of mobile coverage inside the buildings, because of both the communications antennas are saturated and the user is out-of-range.

Therefore, although there is a defined position, the signal outages prevent the sending to the server of said position. As a consequence, the virtual room may not be seen or detected irregularly, i.e., in a part of the premises the room is detected and no in other.

To resolve this problem, the system detects the irregularity in the precision of the position detection, either by analysing the detections that device makes of the room in an erratic manner or by indication of the user. Subsequently, once detected the room, variable time tickets in which the server, regardless of the irregularities, assumes that the user is actually inside the room during a variable period of time defined in said ticket, are provided.

By time ticket it not should be understood a physical ticket, but a period of time allocated on the server for a particular user and a particular connection with a particular room.

For example the normal social behaviour indicates that a person when he/she goes to a restaurant remains in it an average of at least an hour, if the room belongs to a restaurant, the time ticket may be of an hour. In other places the average stay is lower. If the user's device has good detection of the room, the time ticket can be lower so depending on the accuracy it can be of one second.

One of the characteristics of the invention consists in incorporating automatically content that the user has on the device, so it is possible, comparing the music the user has on the device and its importance, for example that it is within the Favourites folder, it is possible that the system knows what is the music that he/she is interested in and that the premises emits songs in the style of the user.

This is especially useful in the case of the hotel rooms, having the system knowledge of music that the user has on the device and when it plays it, it is possible to adapt automatically to tastes of the user. To this end, there is a comparison of the phone data and this communicates the same to the system automatically, the system offering a playlist of the user in the background music. It is also possible knowing the history of use of the user of certain contents provide user said contents, e.g. video, on a particular screen.

It is also possible, knowing the dynamics of temperature that the user tends to use at the time of the day or year to be estimated, which is the temperature of the hotel room that this user needs, by activating the air conditioning or heating to the temperature that the user tends to use. Therefore, this remote control can act automatically depending on the contents on the device or based on the routines of use that the user has developed in different environments. To this end, in the case of air conditioning, it is possible that air conditioning sends the data of room temperature to the device and this stores the different actions until the temperature is adequate, recording this temperature as a function of variables such as the time of day, latitude, weather forecast and other appearance, and thus be able to calculate which is the comfort threshold for the user activating automatically the threshold, for example at night. For this purpose it is possible to ask directly the user if it have had or not heat or cold over a period of time and thus tune best the prediction with not only the data of the execution, but crossing it with the impression that the user has had.

Figure 8:
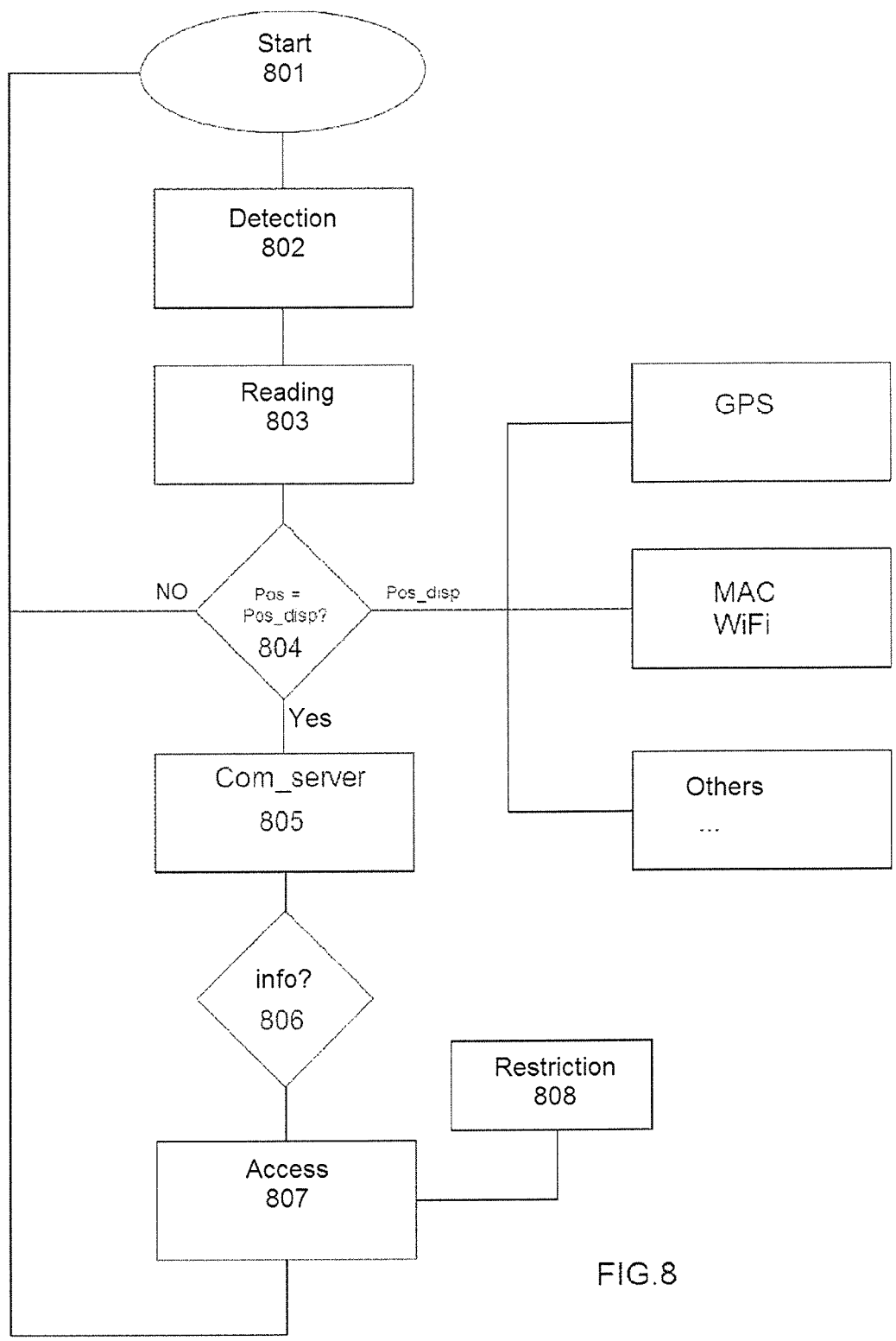
FIG. 8 shows a diagram of a particular embodiment of the method object of the invention related to the use of location codes.

FIG. 8 shows another embodiment of the invention. In this embodiment, the use of the portable electronic device by a user. Thus, sad user 801 enters, for example, a commercial establishment and observes a BIDI code. With the portable electronic device, and more specifically with its camera, detects 802 the presence of the code, reading it 803.

In the code there is a reference to a particular geographical position which may correspond with the premises where the code has been captured or any other geographic coordinate. Said read position is stored in memory of the portable electronic device, to be activated when the portable device is in the position read and stored by the code.

The code is preferably a BIDI code, but is not limited to this type of code, but it can be any code that includes a location, including, but not limited to: BIDI code, barcode, NFC code, a passive RF label, a text command, a voice command, an image, or a combination of the above.

Thus, after the reading of the code, the geographical information is processed and compared 804 with the position of the portable electronic device. After comparison 804, if it is positive, a communication channel 805 is established with an external server, to which is interrogated about available information 806 for that specific position. If the server response is positive, the access to information 807 is allowed.

Subsequently, it is established whether there is or not a temporary restraining 808 for access and that is contained in the read code, and if it is positive, the access will be limited by said restriction. In other embodiments, there may be other types of restrictions included in the read code.

The determination of the portable device position is defined by the position given by the geographical location means of the device itself, including, in a non-limitative sense, a GPS position detector or a program for reading at least one WIFI MAC within range of the device, so that said MAC is sent to an external server to determine if said MAC is related to a particular geographic position contained in a database hosted on said server.

Note that a MAC can be associated with a virtual position, i.e., provided that said MAC is detected, regardless of its location understood as certain coordinates, the access to the server information is allowed as indicated in FIG. 8. For example when the detected MAC is in a moving vehicle, such as a train, plane, boat or any other.

The applications of this particular embodiment (FIG. 8) also in combination with the teachings of the above embodiments, are multiple, highlighting in a non-limitative way:
  i. Commercial application, giving access to a web hosted on the external server with a series of commercial promotions specific for certain store. Thus, the user enters the establishment, reads the code and compares it with the geographical position which, logically, coincides with the store, which is contained in the code. From that moment, its portable electronic device has access to a website with promotions, discounts, or any other commercial aspect, which can be interesting for that place and that time.
  ii. Application for controlling devices, giving access to the control of the same through a replica of the device functionalities on the external server. Thus, for example, by reading the code located on a screen, that unique screen is accessible through the confirmation of the code with the position of the portable electronic device. Thus, the code not only has the geographical position, but the identification of the type of device. It should be taken into account that in home automation applications, the geographical position will be referenced to the house, but within that limited space there are different devices to be controlled such as the television, refrigerator, or washing machine. In each device will exist a code, that in addition to the home position, so that it is only controllable from there, identifies the device that is providing remote access to the virtual replica thereof within an external server, which may be the central controller of the home automation system and allow the remote control thereof, so virtually the user's device becomes a control remote for this device, as described above.
  iii. Security and access control applications, where only sensitive information hosted on the server, for example, when being in a secure room, is accessible.

As stated, the method and system object of the invention has many practical applications, but in general the invention is applicable to any use or application that requires the confirmation of the presence of a user in a certain position, as well as the request of a table at a restaurant and order the possible command receiving the data the restaurant manager, with the certainty of the presence of a user in a certain concrete table.

To facilitate a correct interpretation of the terms used in the present invention we must indicate that user should be understood the portable electronic device of said user (now understood as a person), but also the public-use device described in the invention. That is, and to illustrate this interpretation, one of the possible applications is the system known as "photo-call". With the present invention it is greatly simplifies, since both the user with its portable electronic device equipped with camera and public-use device (a screen) are "users" within the server, and it is allowed establishing a communication between them. That is, the user that makes a photograph can send it to the other user (screen) so that this plays it, since among them a communication channel has been established through the room.

Location must be taken in the broad sense, i.e., a location is a GPS position (and a certain radius of coverage), but is also the WIFI MAC, which can be mobile, and therefore in this case the location is the site where this WIFI is, what it is especially useful in applications of rooms for, for example, courses and conferences, where the room will go where the router which is identified with the MAC goes, having always the course information available on the server information, regardless of its roaming.

The information contained on the server and related to a location should also be taken in the broad sense, since it can be a website, a document or a file in any electronic format. Information, in general, depends on the type of user. If it is a physical user, that is, a person, the information will be the user profile, for example. However, if the user is a screen or an air conditioning, the related information will be that allows their interaction, for example, an interface to control the device. Similarly, the information related to the room will vary depending on the type of room.

The communication channel established between users is not more than that, the possibility of establishing a communication with other users within a determined location, which is what has given access users to the room. This means that, contrary to current social networks (the virtual communication spaces) or other communication systems such as the Whatssap® service, the possibility of communicating does not depend on the user, but the position. It is the access to a determined place what gives access to the room and, in this way, see that other users are present, and then, only then, communicate, or interact with them, at will of the user.

Finally, the creation of virtual rooms is described in document WO2012069686, which is incorporated here by reference, especially in references to the creation of MAC-based and the non-invasiveness thereof, as described in such document.

The invention claimed is:

1. A method for communication between a plurality of users, within a predetermined location, wherein each user is defined by a profile stored in a database hosted on a server, comprising the steps of:

creating one or more virtual communication spaces on a server, wherein each virtual communication space is:
  associated with a location via global positioning system ("GPS") coordinates and one or more WiFi media access control ("MAC") addresses;
  containing information related to said location; and
  accessible by one or more of said users via one or more mobile devices;
accessing the server, by one of the users, via an interface application for accessing the server on a mobile device;
determining the position of the mobile device by:
  determining the GPS position of the mobile device;
  determining the MAC addresses of the visible WiFis;
sending a query including the GPS position and the MAC addresses to the server;
matching, by the server, the GPS position and the MAC addresses included in the query with the GPS positions and MAC addresses associated with the one or more virtual communication spaces, wherein both the GPS positions and one or more MAC addresses need to match;
and only if there is a matching virtual communication space:
  displaying, by the mobile device, the information contained in the matching virtual communication space and a list with other users at the location; and
  establishing a communication channel between the user and the other users present at the location.

2. The method according to claim 1, wherein if there are multiple matching virtual communication spaces, listing, by the mobile device, the matching virtual communication spaces for selecting, by the user one of the matching virtual communication spaces.

3. The method according to claim 1, further comprising:
downloading an application;
entering the application by the user;
connecting with the server;
identifying any communication limitations of the application;
if there are communication limitations:
  applying the communication limitations;
  limiting the presentation of virtual communication spaces and users are presented in a limited manner.

4. The method according to claim 1, further comprising:
asking the user to accept exchanging personal data within the virtual communication space.

5. The method according to claim 1, wherein the virtual space is limited temporarily, being activated or deactivated depending on the activity of the user in that moment, at will of the user, or by imposition on the server.

6. A software product with instructions configured to run by one or more processors that, when are run by a portable electronic device and a server make a system performs the method according to claim 1.

7. A mobile device configured to perform the method steps of claim 1.

8. A server configured to perform the method steps of claim 1.

9. A System for communication between a plurality of users within a predetermined location, comprising:
  a plurality of mobile devices and a server configured to perform the method steps of claim 1.

* * * * *